(12) United States Patent
Kelly et al.

(10) Patent No.: US 12,345,841 B2
(45) Date of Patent: Jul. 1, 2025

(54) PHOTON FLUX MODULATION TO IMPROVE DYNAMIC RANGE IN PHOTON COUNTING DETECTORS

(71) Applicant: HOLOGIC, INC., Marlborough, MA (US)

(72) Inventors: Thomas L. Kelly, Marlborough, MA (US); Cornell Lee Williams, Marlborough, MA (US); Snezana Bogdanovich, Marlborough, MA (US); Robert Gorman, Marlborough, MA (US); Marc Hansroul, Marlborough, MA (US)

(73) Assignee: Hologic, Inc., Marlborough, MA (US)

( * ) Notice: Subject to any disclaimer, the term of this patent is extended or adjusted under 35 U.S.C. 154(b) by 15 days.

(21) Appl. No.: 18/245,152

(22) PCT Filed: Aug. 31, 2021

(86) PCT No.: PCT/US2021/048463
§ 371 (c)(1),
(2) Date: Mar. 13, 2023

(87) PCT Pub. No.: WO2022/066376
PCT Pub. Date: Mar. 31, 2022

(65) Prior Publication Data
US 2023/0358904 A1    Nov. 9, 2023

Related U.S. Application Data

(60) Provisional application No. 63/083,154, filed on Sep. 25, 2020.

(51) Int. Cl.
*G01T 1/17*  (2006.01)
*G01T 1/29*  (2006.01)
(Continued)

(52) U.S. Cl.
CPC .............. *G01T 1/2971* (2013.01); *G01T 1/17* (2013.01); *G01T 7/04* (2013.01); *G01T 1/1635* (2013.01)

(58) Field of Classification Search
CPC ....... G01T 1/1635; G01T 1/17; G01T 1/2971; G01T 7/04
See application file for complete search history.

(56) References Cited

U.S. PATENT DOCUMENTS

| 9,851,460 B1 | 12/2017 | Rodrigues et al. |
| 2007/0003006 A1 | 1/2007 | Tkaczyk et al. |

(Continued)

FOREIGN PATENT DOCUMENTS

| JP | 2009-171990 A | 8/2009 |
| JP | 2016-156748 A | 9/2016 |
| WO | 2013/144812 A2 | 10/2013 |

OTHER PUBLICATIONS

Katsuyuki Taguchi et al., "An analytical model of the effects of pulse pileup on the energy spectrum recorded by energy resolved photon counting x-ray detectors", Med. Phys. 37(8): 3957-3969 (2010).

(Continued)

*Primary Examiner* — Mark R Gaworecki
(74) *Attorney, Agent, or Firm* — Merchant & Gould P.C.

(57) ABSTRACT

Systems and methods for improving radiographic scanning. In an example, the technology relates to a system for performing radiographic scanning. The system includes a photon source configured to emit photons. The system also includes a photon counting detector for detecting photons emitted from the photon source after passing through a target. The photon counting detector comprising first pixels having a first size and second pixels having a second size, and the first size is greater than the second size.

19 Claims, 11 Drawing Sheets

(51) Int. Cl.
*G01T 7/04* (2006.01)
*G01T 1/163* (2006.01)

(56) References Cited

U.S. PATENT DOCUMENTS

| | | |
|---|---|---|
| 2008/0093545 A1 | 4/2008 | Manak |
| 2012/0328176 A1 | 12/2012 | Ren et al. |
| 2016/0206264 A1 | 7/2016 | Fukuda et al. |
| 2018/0292544 A1* | 10/2018 | Persson .................. G01T 1/247 |
| 2020/0060636 A1 | 2/2020 | Wilson et al. |
| 2020/0069266 A1 | 3/2020 | Cai et al. |
| 2024/0331101 A1 | 10/2024 | Ren |

OTHER PUBLICATIONS

International Search Report and Written Opinion for PCT/US2021/048463 (Jan. 26, 2022).
Geiser, William et al., "Artifacts in Digital Breast Tomosynthesis", AJR:211, Oct. 2018, p. 926-962.
PCT International Preliminary Report on Patentability in Application PCT/US2021/048463, mailed Apr. 6, 2023, 11 pages.
Yew Samantha et al., "Digital tomosynthesis: Applications in general radiography", Radiology Open Journal 2020; 4(1): 23-29.

* cited by examiner

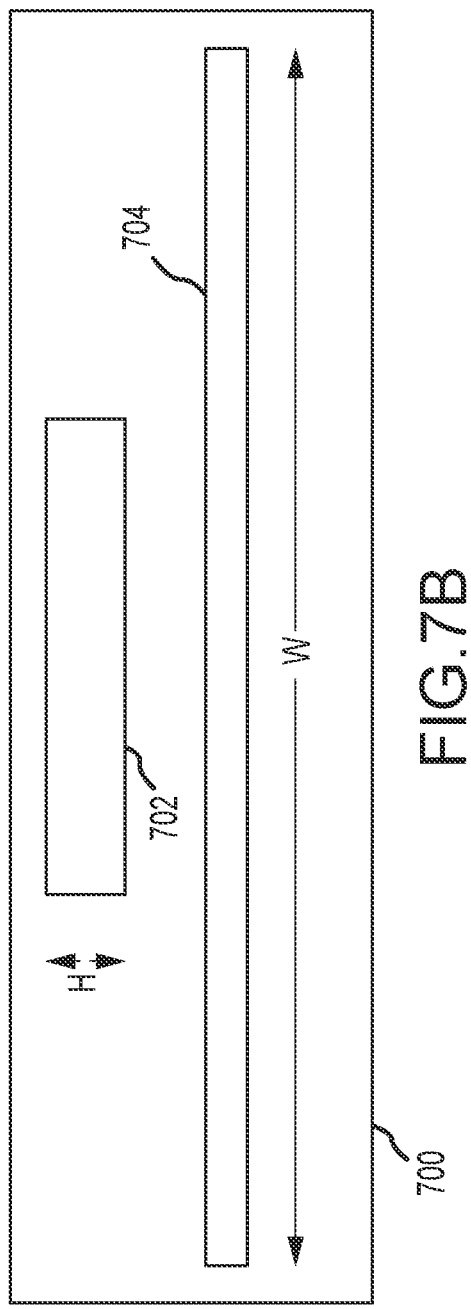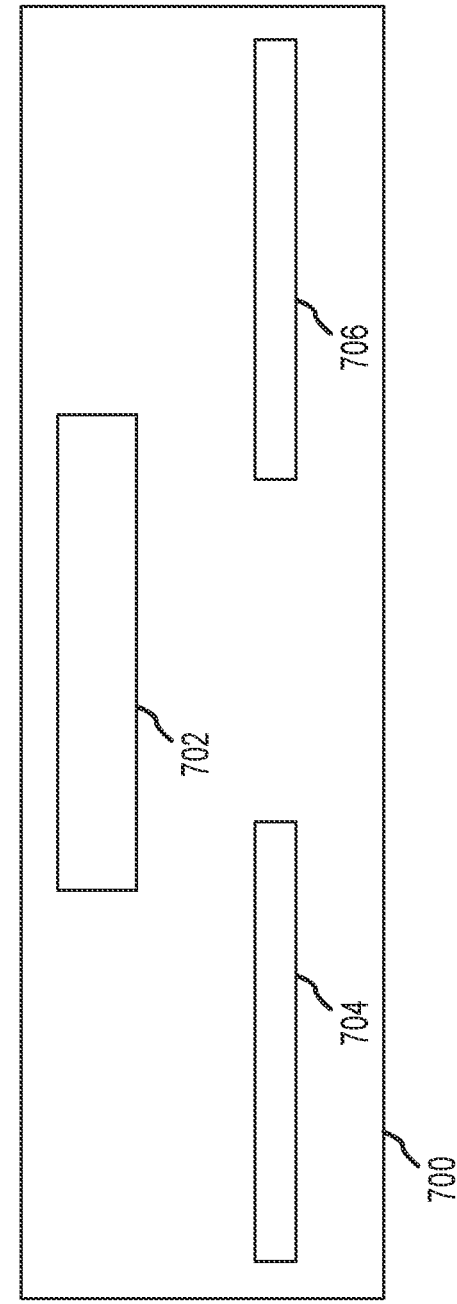

800

```
EMIT A FIRST PHOTON BEAM AT A FIRST INTENSITY FROM THE PHOTON
SOURCE AT A FIRST POSITION RELATIVE TO THE TARGET
802
```

```
EMIT A SECOND PHOTON BEAM AT A SECOND INTENSITY FROM THE PHOTON
SOURCE AT SUBSTANTIALLY THE FIRST POSITION RELATIVE TO THE TARGET
804
```

```
DETECT, BY THE PHOTON COUNTING DETECTOR, THE EMITTED FIRST
PHOTON BEAM AND THE EMITTED SECOND PHOTON BEAM
806
```

```
EMIT A THIRD PHOTON BEAM AT THE FIRST INTENSITY FROM THE PHOTON
SOURCE AT A SECOND POSITION RELATIVE TO THE TARGET
808
```

```
EMIT A FOURTH PHOTON BEAM AT THE SECOND INTENSITY FROM THE PHOTON
SOURCE AT SUBSTANTIALLY THE SECOND POSITION RELATIVE TO THE
TARGET
810
```

```
DETECT, BY THE PHOTON COUNTING DETECTOR, THE EMITTED THIRD
PHOTON BEAM AND THE EMITTED FOURTH PHOTON BEAM
812
```

```
GENERATE INFORMATION ABOUT TARGET
814
```

FIG.8

PHOTON FLUX MODULATION TO IMPROVE DYNAMIC RANGE IN PHOTON COUNTING DETECTORS

CROSS-REFERENCE TO RELATED APPLICATIONS

This application is a National Stage Application of PCT/US2021/048463, filed on Aug. 31, 2021, which claims the benefit of priority to U.S. Provisional Patent Application No. 63/083,154, filed on Sep. 25, 2020, the disclosures of which are incorporated by reference in their entireties. To the extent appropriate, a claim of priority is made to each of the above disclosed applications.

BACKGROUND

Scanning radiographic equipment differs from conventional radiography in that scanning radiography employs a narrowly collimated beam of radiation, typically x-rays, formed into, for example, a pencil beam, a narrow fan beam, or a broad fan beam, rather than a broad area cone beam. The compact beam size allows the replacement of an image forming sheet of radiographic film, used with conventional radiographic equipment, with a small area array of electronic detector elements. Further, the scanning allows the collection of data over a much broader area than would be practical with a single x-ray cone beam. The radiation detector elements receiving the transmitted radiation produce electrical signals which may be discriminated by pulse height into various pulse height bins and counted or charge integrated and converted to digital values by an analog-to-digital converter for the later development of an image or for other processing by computer equipment.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for improving radiographic scanning. In an example, the technology relates to a system for performing radiographic scanning. The system includes a photon source configured to emit photons; and a photon counting detector for detecting photons emitted from the photon source after passing through a target, the photon counting detector comprising first pixels having a first size and second pixels having a second size, wherein the first size is greater than the second size.

In an example, the first pixels are arranged in a first row of the photon counting detector and the second pixels are arranged in a second row of pixels. In another example, the first pixels are arranged in an alternating pattern with the second pixels. In a further example, the pixel density of the first pixels is greater in a central third of the photon counting detector than an outer third of the photon counting detector. In still another example, the system further includes a slit aperture positioned between the photon source and the photon counting detector; and a photon absorber positioned adjacent an outer portion of the slit aperture to absorb a portion of the photons emitted from the photon source. In yet another example, the photon absorber is adjustable to increase or decrease an amount of the slit aperture that is covered by the photon absorber. In still yet another example, the photon source is an x-ray tube, and the photon absorber includes at least one tungsten pin.

In another example, the system further includes a first slit aperture positioned between the photon source and the photon counting detector, the first slit aperture having a first slit height; and a second slit aperture positioned between the photon source and the photon counting detector, the second slit aperture having a second slit height, wherein the second slit height is less than the first slit height. In a further example, the first pixels are aligned with the first slit aperture and the second pixels are aligned with the second slit aperture.

In another aspect, the technology relates to a method for performing radiographic scanning of a target. The method includes emitting a first x-ray beam at a first intensity from an x-ray source at a first position relative to the target; emitting a second x-ray beam at a second intensity from the x-ray source at substantially the first position relative to the target; and detecting the emitted first x-ray beam and the emitted second x-ray beam. The method further includes emitting a third x-ray beam at the first intensity from the x-ray source at a second position relative to the target; emitting a fourth x-ray beam at the second intensity from the x-ray source at substantially the second position relative to the target; and detecting the emitted third x-ray beam and the emitted fourth x-ray beam.

In an example, the first x-ray beam, the second x-ray beam, the third x-ray beam, and the fourth x-ray beam all have substantially the same energy spectrum. In another example, the first x-ray beam is passed through a filter that results in filtered x-ray radiation including high-energy x-ray photons and low-energy x-ray photons. In a further example, the high-energy x-ray photons have an energy above the k-edge; and the low-energy x-ray photons have an energy below the k-edge. In still another example, the first x-ray beam and the third x-ray beam are emitted during a first scan of the target and the second x-ray beam and the fourth x-ray beam are emitted during a second scan of the target. In yet another example, the method further includes emitting a fifth x-ray beam from an x-ray source at substantially the first position, wherein the fifth x-ray beam has an energy spectrum different from the first x-ray beam and the second x-ray beam.

In another example, the technology relates to a system for radiographic scanning. The system includes a photon source mounted to a source assembly configured to move along a longitudinal axis of a target; a photon counting detector mounted to a detector assembly configured to move along a longitudinal axis of the target, the photon counting detector configured to count photons in photon beams emitted by the photon source. The system also includes a processor; and memory storing instructions that, when executed by the processor, cause the system to perform a set of operations. The set of operations include emitting a first photon beam at a first intensity from the photon source at a first position relative to the target; emitting a second photon beam at a second intensity from the photon source at substantially the first position relative to the target; detecting, by the photon counting detector, the emitted first photon beam and the emitted second photon beam; emitting a third photon beam at the first intensity from the photon source at a second position relative to the target; emitting a fourth photon beam at the second intensity from the photon source at substantially the second position relative to the target; and detecting, by the photon counting detector, the emitted third photon beam and the emitted fourth photon beam.

In an example, the first photon beam and the second photon beam have substantially the same energy spectrum. In another example, the photon counting detector comprises first pixels, having a first size, and second pixels, having a second size, wherein the first size is greater than the second size. In a further example, the first pixels are arranged in a first row of the photon counting detector and the second pixels are arranged in a second row of pixels. In still another example, the system further includes a slit aperture positioned between the photon source and the photon counting detector; and a photon absorber positioned adjacent an outer portion of the slit aperture to absorb a portion of the photons emitted from the photon source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 7A-C depict examples slit aperture configurations.

FIG. 8 depicts an example method for modulating flux.

DETAILED DESCRIPTION

Figure 1A:
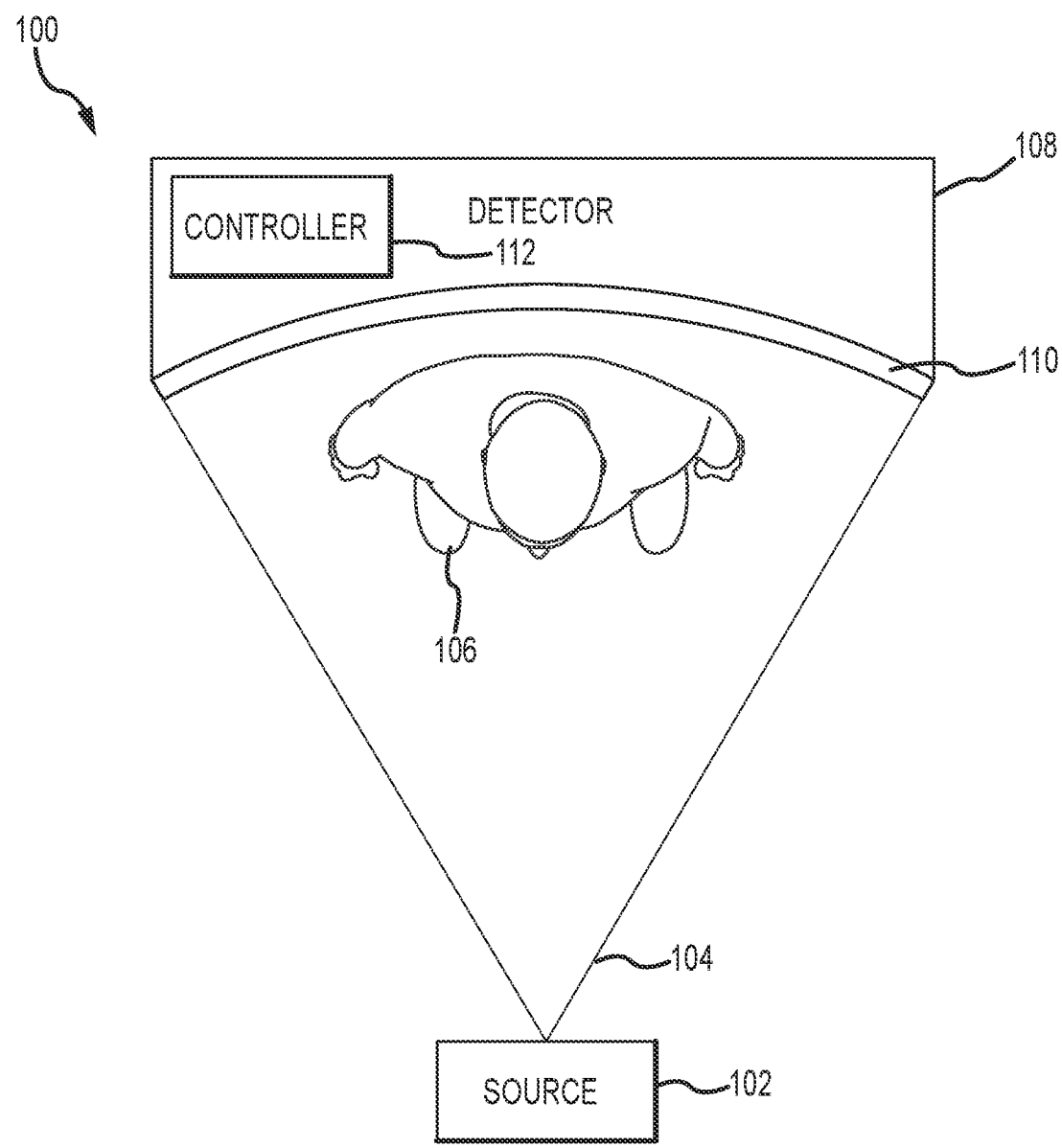
FIGS. 1A-1B depict an example radiographic scanning system.

As discussed above, during radiographic scanning, such as x-ray scanning, a photon source emits a photon beam, such as x-ray radiation, as a fan beam towards a target. The photon beam is attenuated by the target and ultimately detected by the detector. The detector may detect the attenuated photon beam by counting the number of photons that reach the detector. The detector itself includes a number of pixels, and each pixel detects the number of photons that reach the pixel. Such photon counting x-ray and gamma ray detectors include vacuum-based photomultipliers, crystalline semiconductors (Cadmium Telluride and Cadmium Zinc Telluride CZT), and solid-state silicon sensors (avalanche diodes and silicon photomultipliers).

Based on the number of photons detected at each pixel, information about the target, such an image of the target and/or composition of the target, is generated. The detector may also include energy discrimination technology to discern whether each pixel is a high-energy photon (e.g., a photon having a high electronvolt (eV) value) or a low-energy photon (e.g., a photon having a low eV value). Photon counting detectors that can also discriminate between energies of the photons may be referred to as energy discriminating photon counting detectors. One application of such radiographic scanning technology is densitometer technology that uses dual-energy x-ray radiation, such as the technology described in U.S. Patent Publication No. 2020/0060636, titled "Methods for Physiological State Determination in Body Scans," (hereinafter the '636 Publication) which is incorporated herein by reference in its entirety. Other applications include position sensing and industrial gauging, dosimetry, x-ray diffraction, site monitoring and threat detection, gamma ray spectroscopy, nuclear medicine imaging, single-photon emission computed tomography (SPECT), radiotracer tracking, and dual-energy x-ray absorptiometry.

The quality of the scan and generated information depends on the pixels of the detector accurately recording the photon counts. The pixels, however, can be subject to a wide dynamic range of flux rates of photons. For instance, in some clinical and research settings, flux rates may vary from a single photon per second per square millimeter to one hundred million photons per second per square millimeter. When the photon flux is very high, the photons may overwhelm the detector pixel elements, e.g. the detector pixel and/or electronics may experience deadtime losses, pulse pileup, or baseline shifts, leading to inaccuracies in the number or energy of the detected photons. In contrast, when the photon flux is too low, statistical and quantum errors occur, which also leads to inaccurate results. Even when the incident photon rate is a small fraction of the detector's maximum bandwidth, pulse pileup and baseline shifting can lead to count rate inaccuracies and spectral distortion. One example discussion of pulse pileup is described in Taguchi, Katsuyuki et al. "An analytical model of the effects of pulse pileup on the energy spectrum recorded by energy resolved photon counting x-ray detectors."*Medical Physics* vol. 37,8 (2010): 3957-69. doi:10.1118/1.3429056.

In some medical applications, accurate recording of spectral information of x-ray radiation that passes through unattenuated air and through tissue having thicknesses in excess of 30 cm is required during the same examination or scan. Such a scan results in a flux range from 1 photon per second per square millimeter to 5-10 million photons per second per square millimeter. For instance, dual-energy x-ray absorptiometry of very large subjects in the human performance space, e.g. professional athletes, is an application where photon counting detectors must be able to accurately record x-ray counts in two different energy bins in the empty "air" regions of the exam and through the abdomen and chest where the tissue thickness may exceed 30 cm.

Typically, to scan such large subjects, a low intensity x-ray source is used to accurately record data in thin and medium thickness regions and tolerate excessive image noise in the thicker regions where less photons reach the detector. The noise in the thick regions due to a low photon count is mitigated by noise reduction algorithms and techniques, such as coaddition of neighboring pixels, image smoothing, or through non-local denoising algorithms, etc. Such techniques, however, adversely impact image quality, measurement accuracy, and reproducibility in the thicker regions of the exam.

The present technology presents methods and systems that improve radiographic scanning systems that implement photon counting detectors by altering the photon beams that are emitted and/or altering the pixels of detector. In one example, two scans of the subject or target are performed with two different flux rates or intensities. In another example, the photon source may be pulsed alternately between low and high flux rates. Thus, information about areas with low target thickness or air can be generated based on the low-intensity emissions, and information about areas with high target thickness can be generated based on the high-intensity emissions.

Changes to the photon source and/or the detector may also be implemented. For example, a modified slit aperture between the photon source and the detector may be incorporated. Portions of the slit aperture may include x-ray absorbing filters that absorb photons that would have been directed on a low-attenuation path. Thus, the pixels of the detector in the low-attenuation path are less likely to become overwhelmed by excessively high incident photon count rates. Multiple slit apertures of different sizes or configurations may also be implemented and aligned with different pixels to separate low-intensity and high-intensity emissions. The configuration and size of the pixels of the detector may also be altered. For example, an array of both large and small pixels may be incorporated such that some pixels are not overwhelmed while other pixels do not have too low of a photon count. In each example, a larger range of photon flux can be tolerated and utilized in performing the radiographic scanning.

FIG. 1A depicts an example radiographic scanning system 100 for scanning a target 106. The system 100 includes a photon source that emits a fan beam 104 of photons and a detector 108 that detects the emitted photons. The photon source 102 may be an x-ray tube or other type of x-ray emitter. The photon source 102 may also be a gamma-ray emitter or a photon emitter of a different wavelength. The fan beam 104 of photons travels on a path from the photon source 102 to the detector 108. A portion of the photons of the fan beam 104 travel through the target 106. The target 106 attenuates the photons, and thus, the photons that are detected by the detector 108 may be used to generate information about the target.

The detector 108 includes a plurality of pixels housed in a pixel housing 110. Each of the pixels may vary in size as discussed further herein. In one example, each pixel may have an average area of about 5 square millimeters. Each pixel generates an electric signal upon being impacted by a photon. The electric signals generated by each pixel may be processed by a controller 112. For instance, the controller 112 may process the counts of photons that are received by the pixels. In examples where the detector 108 is a discriminating detector 108, the controller 112 may also process the number of the photons of different energies that are received by each pixel. Based on the location of the pixels and the pixel counts, information about the target 106 may be generated.

The controller 112 may include one or more processors and memory that stores instructions for executing operations, such as the operations discussed herein. The controller 112 may be housed inside or outside the detector 108. In some examples, some components of the controller 112 may be housed within the detector 108 and other components of the controller 112 may be housed outside of the detector 108. In examples where the controller 112, or components of the controller 112, are housed outside the detector 108, the controller 112 may be operatively connected to the detector 108, such as via a wireless or wired connection.

Figure 1B:
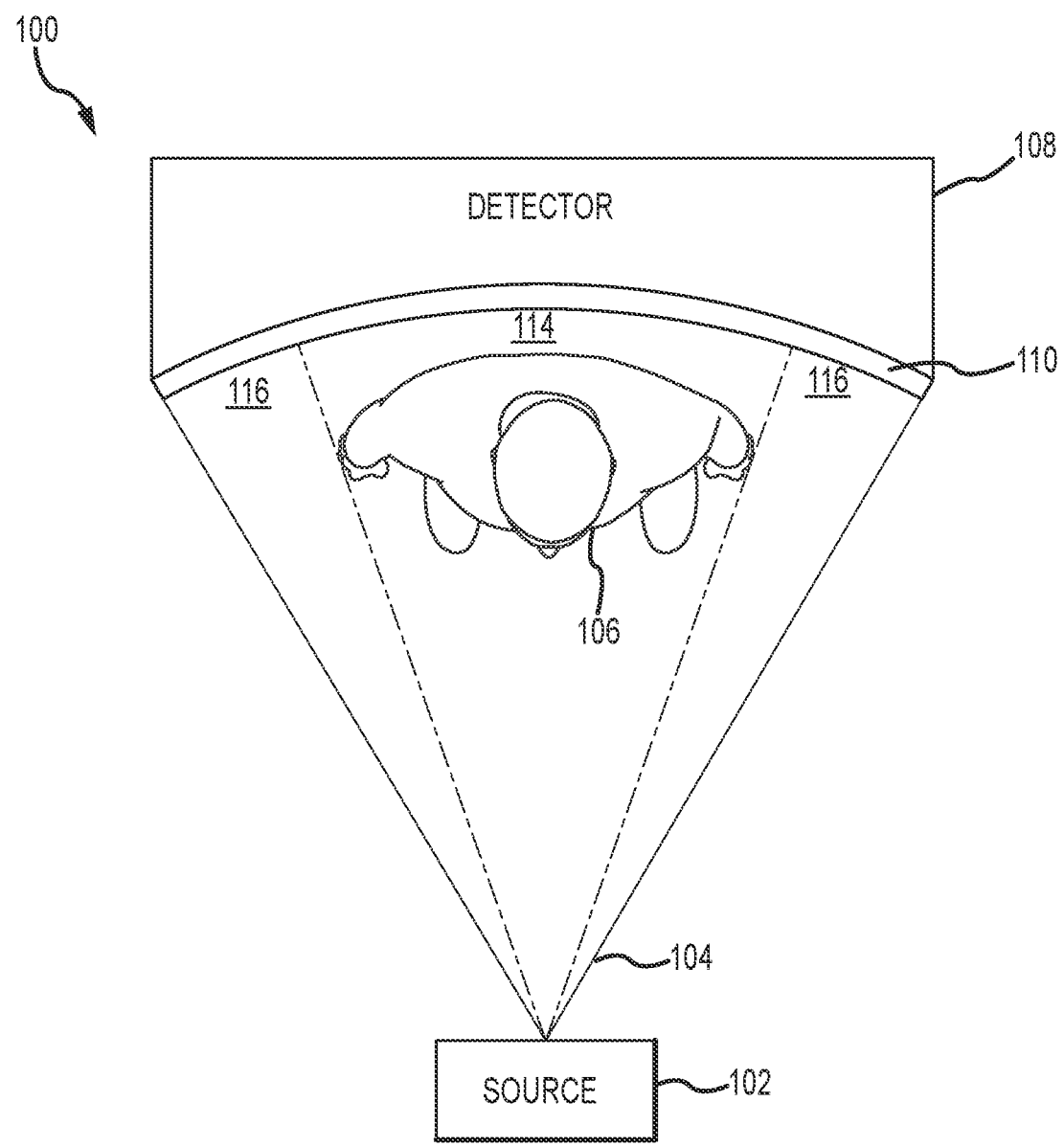

FIG. 1B depicts the example system 100 with portions of the fan beam 104 highlighted. As can be seen from FIGS. 1A-1B, some of the photons in the fan beam 104 pass through the target 106, and some of the photons merely pass through air. Due to the attenuation of the photons by the target 106, the number of photons that reach the pixels behind the target 106 is less than the number of pixels that reach the pixels that are not attenuated by the target. The beam paths of the photons that do not pass through the target are indicated in FIG. 1B by the unattenuated beam paths 116. The beam path of the photons that are attenuated by the target 106 is indicated in FIG. 1B by the attenuated beam path 114. There also may be portions of the depicted attenuated beam path 114 that are either minimally attenuated or unattenuated, such as where the photons pass through thin tissue of the patient or merely through air (e.g., above the shoulders, between the legs, between forearms and abdomen, etc.). While those particular beam paths are not separately labeled in FIG. 1B, photons that are minimally attenuated by the target 106 will be referred to herein as traveling on a minimally attenuated beam path and the photons that are unattenuated by the target 106 will be referred to herein as traveling on an unattenuated beam path. The minimally attenuated beam path may be a beam path where the photons pass through tissue of the target being about 1 cm or less. While the photons traveling on an unattenuated beam path may be slightly attenuated by the air in the system, for the purposes of this application, those photons are referred to herein as unattenuated or unattenuated by the target 106.

As discussed above, where the photons are unattenuated or minimally attenuated, a large flux of photons is received by the pixels in the unattenuated or minimally attenuated beam paths. For instance, in the unattenuated beam path, the flux of photons may be 5-10 million photons per second per square millimeter or higher. In contrast, for a beam path that passes through the thickest portion of the target (e.g., 30 cm of tissue), the flux of photons may drop to as low as one photon per second per square millimeter.

The following Table 1 provides data for flux rates of different attenuation paths of photons having different energies. The flux rates in Table 1 are from a simulation using a pixel having an area of 4.84 square millimeters. The photon source was an x-ray tube operated at 100 kV with a cathode current of 5 mA. In addition to an inherent filtration of approximately 3 mm aluminum, a 250 micron thick samarium filter was employed at the aperture to separate the x-ray beam into two distinct energy lobes via k-edge absorption of the photons in the middle of the energy band.

TABLE 1

Flux Rates for 4.84 mm$^2$ Pixel

| Target | Pixel Count Rate (photons/sec) | High Energy Photons (photons/sec) | Low Energy Photons (photons/sec) |
| --- | --- | --- | --- |
| Air | 4.15E+06 | 1.90E+06 | 2.21E+06 |
| 5 mm of PMMA | 3.67E+06 | 1.72E+06 | 1.94E+06 |
| 25 mm of PMMA | 2.26E+06 | 1.13E+06 | 1.12E+06 |
| 3 cm Al & 30 cm of PMMA | 662 | 645 | 17 |

In Table 1, the first column represents a type of target and thickness of the target that was in the beam path of the photons. The targets used included polymethyl methacrylate (PMMA), which is substantially equivalent to human soft tissue with respect to attenuation properties, and aluminum, which can be used to estimate attenuation properties of human bone. The second column indicates the number of photons counted by the pixel. The third column indicates the number of high-energy photons (e.g., photons having an energy between 49.5-99.5 keV) that were counted by the pixel. The fourth column indicates the number of low-energy photons (e.g., photons having an energy between 26.5-46.5 keV). As can be seen from Table 1, the number of photons counted drops substantially as the thickness of the target increases.

Table 2, below, provides flux rates for a pixel having an area of 8.8 square millimeters using the same photon source and target configurations as Table 1.

TABLE 2

Flux Rates for 8.8 mm$^2$ Pixel

| Target | Pixel Count Rate (photons/sec) | High Energy Photons (photons/sec) | Low Energy Photons (photons/sec) |
|---|---|---|---|
| Air | 7.55E+06 | 3.45E+06 | 4.03E+06 |
| 5 mm of PMMA | 6.68E+06 | 3.09E+06 | 3.52E+06 |
| 25 mm of PMMA | 4.11E+06 | 2.05E+06 | 2.04E+06 |
| 3 cm Al & 30 cm of PMMA | 1204 | 1173 | 31 |

As can be seen from Table 2, the number of photons counted by the larger pixel are substantially higher than the number of photons counted by the smaller pixel of Table 1. Where the beam path is through thick tissue, the increased photon count is beneficial. Where the beam path is unattenuated or minimally attenuated, however, the increase in photon count may be undesirable. For example, some photon-counting detectors or pixels have maximum cutoffs for the number of photons that can be counted. In some implementations, the maximum count rate is around four million photons per second (i.e., 4E+06 photons/sec). Accordingly, for the smaller pixel that is the subject of Table 1, that example maximum count rate is exceeded for pixels in the unattenuated beam path. For the larger pixel that is the subject of Table 2, the example maximum count rate is exceeded for all modeled beam paths other than the beam path passing through the thickest target (e.g., 30 cm PMMA & 3 cm aluminum). As discussed further below, based on the flux rates and beam paths, the present technology may utilize large and small pixels within the same detector to more accurately count the photons that are emitted by the photon source. In addition, with the present technology, the intensity (i.e., number of photons) of the fan beam that is emitted by the photon source may be modulated such that the detector is able to more accurately process the photons and generate information about the target. In other examples, the fan beam may be modified through slit apertures and absorbers placed between the photon source and the detector.

Figure 2:
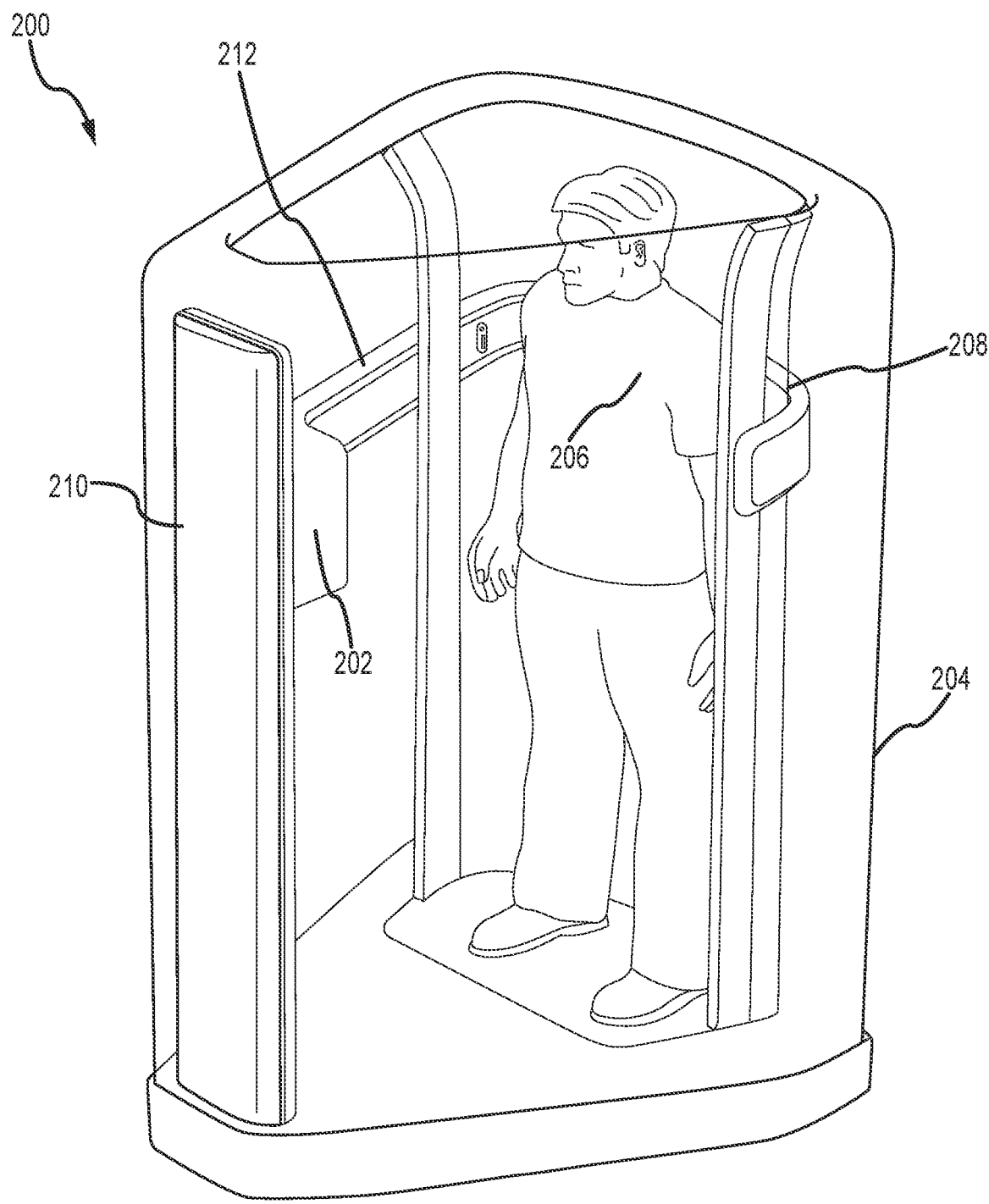
FIG. 2 depicts an example of a stand-up radiographic scanning system.

FIG. 2 depicts an example of a stand-up radiographic scanning system 200. The standup radiographic scanning system 200 includes a housing or enclosure 204 that includes a photon source 202 that emits photons towards a detector 208. The photons emitted from the photon source 202 pass through a target 206 and are detected by the detector 208. The detector 208 may include similar components as the detector 108 discussed above with reference to FIGS. 1A-1B. The photon source 202 and the detector may be physically connected via an arm 212.

The photon source 202 is connected to a support structure 210. In the example depicted, the support structure 210 is a vertical structure, but other types of structures are possible. The support structure 210 may include a lift mechanism that raises and lowers the photon source 202. Because the photon source 202 is physically connected to the detector 208, movement of the photon source 202 causes movement of the detector 208. Accordingly, during movement of the photon source 202, the photon source 202 and the detector 208 remain aligned.

As the photon source 202 moves vertically along a longitudinal axis of the target 206, photons are emitted from the photon source 202 and detected by the detector 208. The photon source 202 may emit photons while the photon source 202 is moving. In other examples, the photon source 202 may temporarily stop moving while the photons are emitted and then resume motion. Accordingly, the target 206 can be fully scanned from top to bottom. In examples where the target 206 is a human, the target 206 can be scanned from head to toe. Sub-portions of the target 206 may also be scanned rather than the entire target, if desired. The fan beam emitted from the photon source 202 may be wide enough to span the width of the entire target 206. In other examples, the photon source 202 may also be moved in a direction orthogonal to the vertical movement to allow for capture of the entire width of the target. At each vertical position, the photons emitted from the photon source 202 are counted by the pixels of the detector 208. Based on the photon counts of each of the pixels at each of the vertical positions, information about the target may be generated, such as the body composition information discussed in the '636 Publication.

While system 200 is for a stand-up configuration, the components of the scanning system 100 of FIGS. 1A-1B may be configured for a supine position (or other position) of the target, as described in the '636 Publication, for example. Other configurations are also possible.

Figure 3:
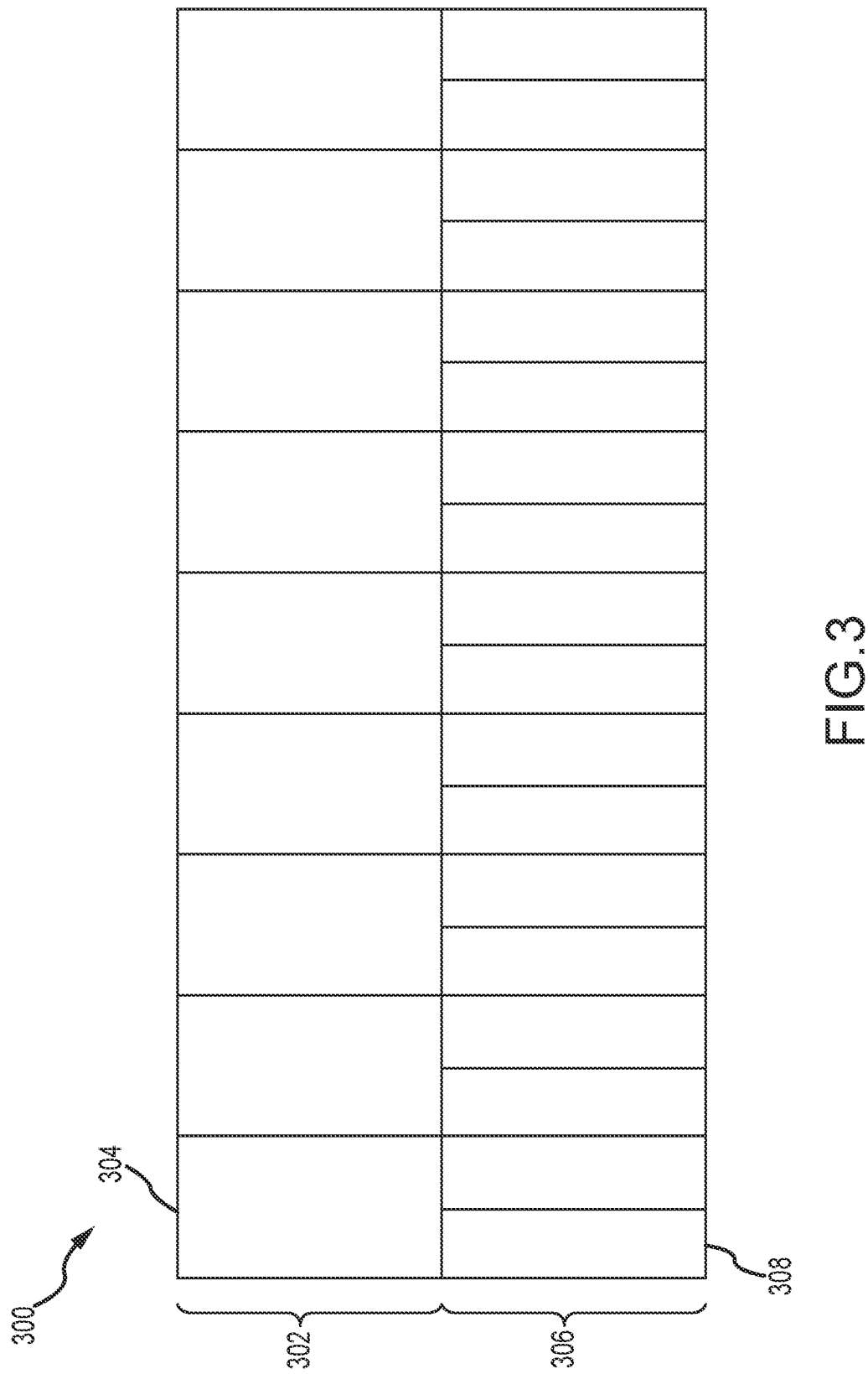
FIG. 3 depicts an example array of pixels of a detector.

FIG. 3 depicts an example array of pixels 300 of a detector. The array of pixels 300 includes large pixels 304 and small pixels 308 that are arranged in two rows. A first row 302 includes large pixels 304 and the second row 306 includes small pixels 308. The size of the pixel (e.g., large or small) references the detection surface area of the pixel that is configured to detect a photon. As an example, a small pixel may be a 4.84 mm pixel that was the subject of Table 1, above, and a large pixel may be an 8.8 mm pixel that was the subject of Table 2, above. In other examples, the large pixel 304 may simply be larger than the small pixel 308. In some examples, the large pixel 304 may have a detection surface area that is about two times greater than the detection surface area of the small pixel 308. In other examples, there may also be different sized pixels, such as medium sized pixels that have a size between the large pixel 304 and the small pixel 308. The medium sized pixels may be located in a third row that may be above, below, or between the first row 302 and the second row 306. Additional rows of still different sized pixels may also be incorporated. In addition, in the example depicted, the first row 302 is vertically adjacent to the second row 306, but in other examples, the first row 302 may be spaced from the second row 306 such that there is a gap between the first row 302 and the second row 306.

By incorporating large pixels 304 and small pixels 308 into the detector, a wider range of photon flux values may be handled by the radiographic scanning system. For instance, information about portions of the target that are thick (e.g., in a highly attenuated beam path) may be generated from the large pixels 304. Because the large pixels 304 have a larger detection surface area, more photons will impact that large surface area, thus increasing the photon count for the large pixels as compared to the small pixels. As discussed above, having too low of a photon count may lead to statistical or quantum errors that result in reduced accuracy of the generated information about the target. By increasing the size of the pixel, the photon count is increased, which reduces the statistical or quantum errors. Nevertheless, having an array of pixels 300 with only large pixels 304 would potentially cause problems with pulse pileup and overwhelming pixels that are in minimally attenuated or unattenuated beam paths. In addition, having an array of pixels 300 with only large pixels would also reduce the overall spatial resolution of the information generated from the photon counts of the pixels. Accordingly, the present example also includes small pixels 308 in the array of pixels 300 that receive less photons than the large pixels 304. Thus, information about portions of the target that are thin (e.g., in a minimally attenuated beam path) may be generated from the small pixels 308.

The ratio between the size of the largest pixel and the size of the smallest pixel of the detector is referred to herein as the pixel-size ratio. The pixel-size ratio may vary depending on the particular implementation. For instance, for implementations that are intended to scan low-attenuation or low-thickness targets, the pixel-size ratio may be closer to 1. For implementations that are intended to scan high-attenuation or high-thickness targets, the pixel-size ratio may be greater. By having a greater pixel-size ratio, a wider amount of photon flux may be handled by the radiographic scanning system. In some examples, the pixel-size ratio may be less than about 1.25, less than about 1.5, less than about 1.75, less than about 2, less than about 3, between 1.25 and 1.5, between 1.5 and 2, and between 1.5 and 3, amount other potential values.

The relative shape and/or dimensions of the large pixels 304 and small pixels 308 may be the same or different. For instance, in the example depicted, both the large pixels 304 and the small pixels 308 have a rectangular shape with a height greater than the width. Also, in the example depicted, the height of the large pixels 304 and the height of the small pixels 308 are the same. In other examples, the heights may be different. In addition, other shapes, such as squares, chevrons, pentagons, hexagons, octagons, etc. are possible and the shapes of the large pixels 304 and the small pixels 308 may or may not match. In one example, both the large pixels 304 and the small pixels 308 are in the shape of hexagons and form part of a honeycomb pattern with two or more rows.

In some examples where two or more rows of pixels are incorporated into the detector, two or more fan beams of photons may be generated. A first fan beam is aligned with the first row 302 of pixels and the second fan beam is aligned with the second row 306 of the pixels. Two fan beams may be generated by including two slit apertures near the photon source and located between the photon source and the detector. The first slit aperture may be aligned with the first row 302 of pixels such that the fan beam passing through the first slit aperture is directed to the first row 302 of pixels. Similarly, the second slit aperture may be aligned with the second row 306 of pixels such that the fan beam passing through the second slit aperture is directed to the second row 306 of pixels.

Figure 4A:
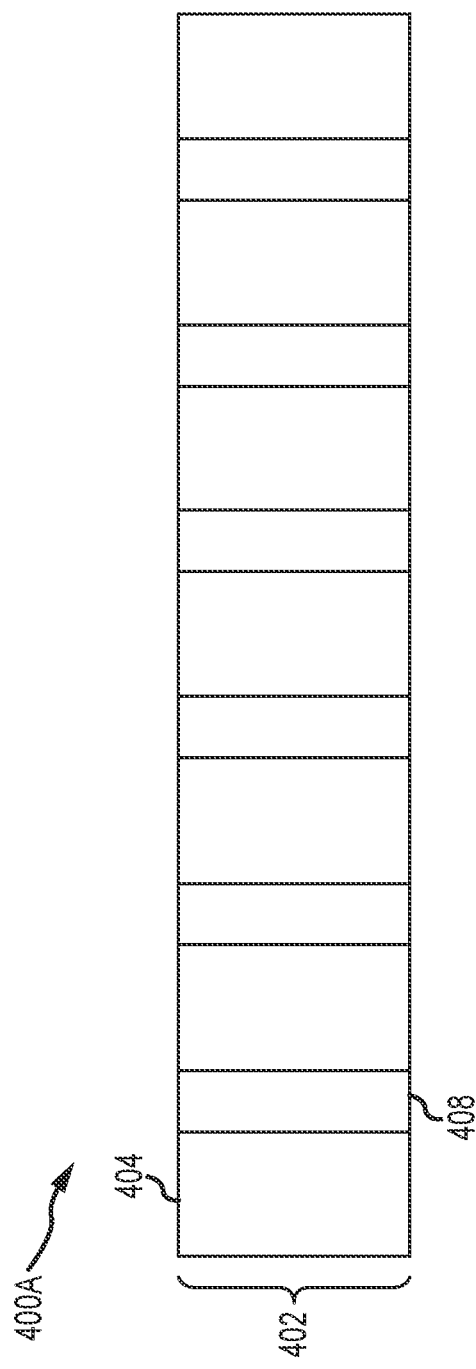
FIGS. 4A-B depicts example arrays of pixels of a detector.

FIG. 4A depicts another example array 400A of pixels. The array 400A of pixels includes a row 402 of alternating large pixels 404 and small pixels 408. The large pixels 404 and the small pixels 408 may have the same or similar sizes as the large pixels and small pixels discussed above. For instance, in the example depicted in FIG. 4A, the large pixels 404 and small pixels 408 are both rectangles having the same height. By alternating the large pixels 404 and the small pixels 408, similar benefits to the array discussed with respect to FIG. 3 may be achieved. For example, the small pixels 408 serve better in areas with high photon flux and the large pixels 404 serve better in areas with low photon flux.

Accordingly, information about the target may be generated from both the photon count of the large pixels 404 and the small pixels 408.

Figure 4B:
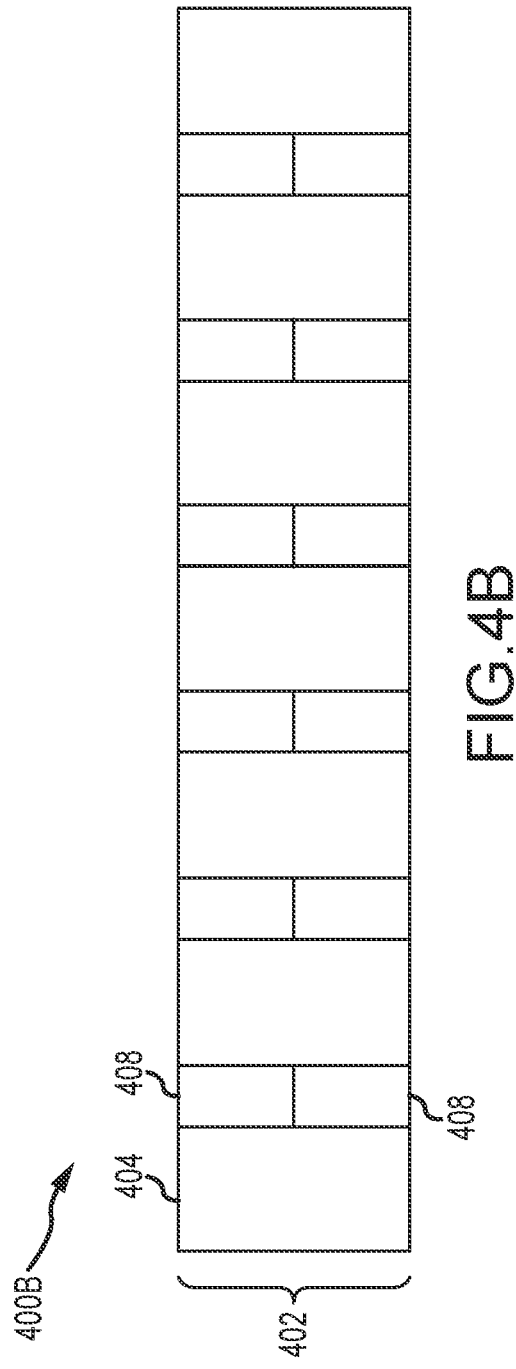

FIG. 4B depicts another example array 400B of pixels. Similar to the array 400A depicted in FIG. 4A, the array 400B includes one row of pixels with alternating large pixels 404 and small pixels 408. The pixels include large pixels 404 and small pixels 408. In contrast to the array 400A, the small pixels 408 in array 400B differ in both width and height from the large pixels 404. In the example depicted in FIG. 4B, the small pixels 408 are half the height and width of the large pixels 404. In such an example, two small pixels 408 may be included that are vertically adjacent to one another. In some sense, there are two rows of small pixels 408 and one row of large pixels 404. By arranging the pixels in such a manner, the pixel-size ratio may be increased while retaining a constant height for the array 400B.

In other examples, the large pixels 404 and small pixels 408 may not alternate on a one-to-one basis. For instance, two large pixels 408 may occur followed by one or two small pixels 408. Other alternating patterns are also possible.

Figure 5A:
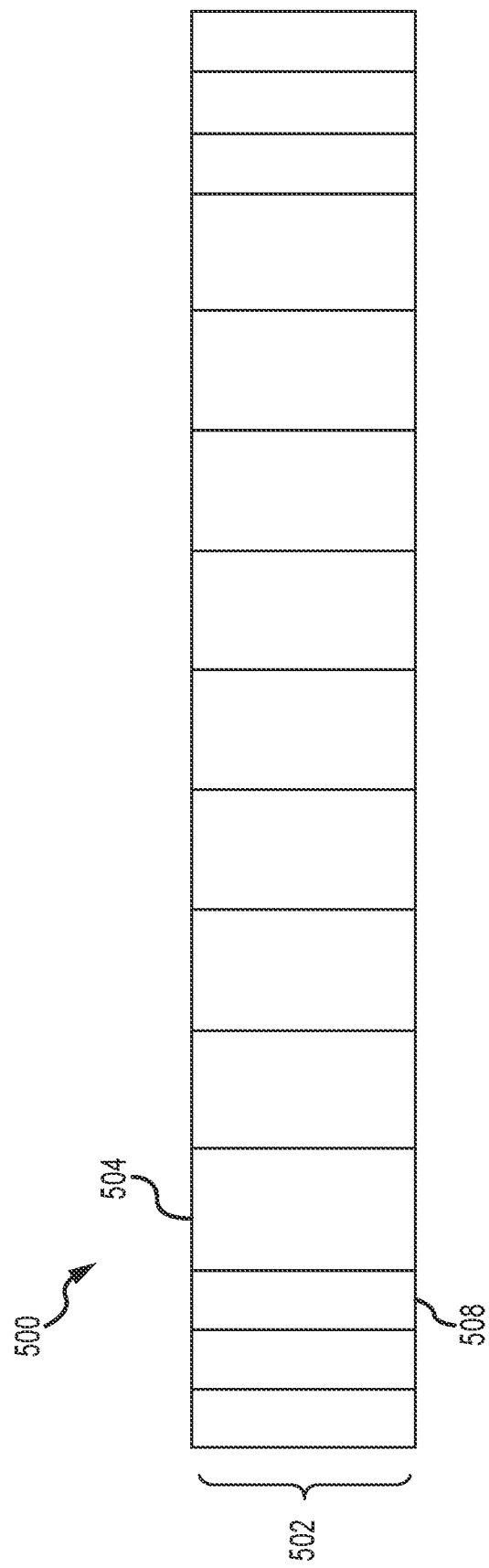
FIG. 5A depicts another example array of pixels of a detector.

FIG. 5A depicts another example array 500 of pixels of a detector. The array 500 includes large pixels 504 and small pixels 508. The large pixels 504 and small pixels 508 may have the sizes and shapes of the other large pixels and small pixels discussed above. In the array 500, the pixels are configured such that the outer portions of the array 500 include small pixels 508 and the central portion of the array includes large pixels 504. Thus, for targets such as those depicted in FIGS. 1A-B and 2, the outer portions of the detector, that are more likely to be in a minimally attenuated or unattenuated beam path, include more small pixels 408 than larger pixels. In some examples, the outer thirds of the detector have more small pixels 408 than the central third of the detector. Similarly, the central third may have more large pixels 404 than the outer thirds. In other words, the pixel density of the large pixels 404 is greater in the central third of the detector than the outer thirds of the detector. Accordingly, the pixel density of the small pixels 408 is greater in the outer thirds than in the central third of the detector. The pixel density may be measured by the number of pixels present in a linear distance of the detector running in the same direction of the array. In some examples, the large pixels 404 and the small pixels 408 may alternate or be mixed such that the pixel density of the large pixels 404 remains greatest near the center of the detector, such as the central third for the detector.

Figure 5B:
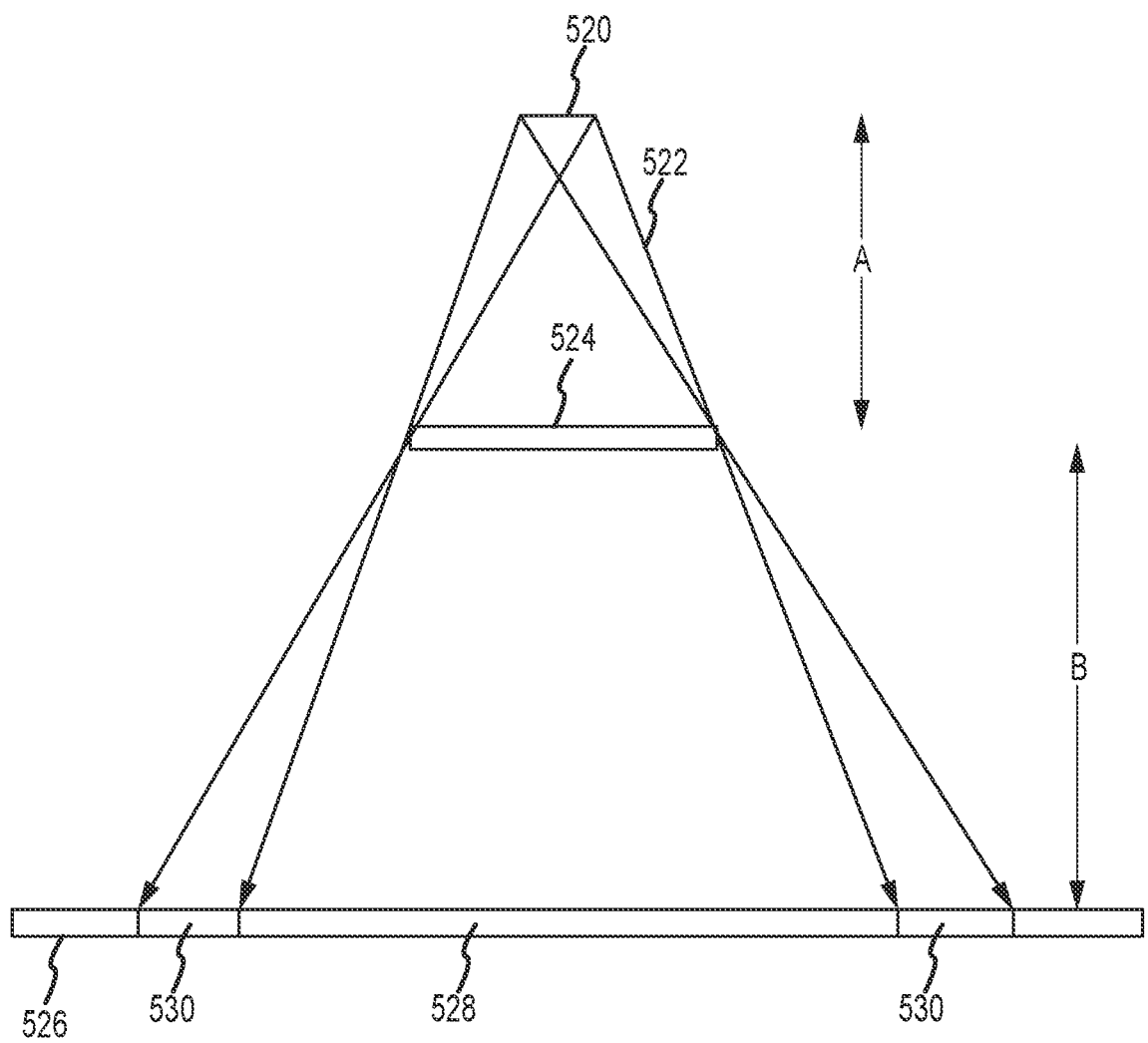
FIG. 5B depicts an umbra and a penumbra of a fan beam.

FIG. 5B depicts an umbra and penumbra of a fan beam 522 generated from a focal spot 520 of a photon source. The fan beam 522 travels from the focal spot 520 through a target 524 and ultimately to a detector 526, which has one or more rows of pixels for detecting the photons in the fan beam 522. Due to the manner in which photons are released from the focal spot 520 and the interactions of the photons and the target, an umbra and a penumbra of the fan beam is formed. The penumbra of the fan beam reaches the penumbra section 530 of the detector 526 and the umbra of the fan beam reaches the umbra section 528 of the detector 526. The size of the penumbra is based on the apparent focal spot 520 size. For instance, a larger focal spot 520 results in a larger penumbra. The source-to-target distance (A) and the target-to-detector distance (B) also have an effect on the size of the penumbra. For instance, a greater source-to-target distance (A) results in a smaller penumbra. In contrast, a greater, target-to-detector distance (B) results in a larger penumbra.

Depending on the thickness of the target, the intensity or flux of the photons in the umbra may be greater than the intensity or the flux of the photons in the penumbra. Thus, the pixels in the umbra section 528 of the detector 526 and the pixels in the penumbra section 530 of the detector may be sized accordingly. For instance, the small pixel density in the penumbra section 530 may be different from the small pixel density in the umbra section 528 of the detector.

Further, as should be appreciated, the pixel size and number of pixels have not been drawn to scale in FIGS. 3-5. In an implementation such as system 100 and system 200, the detector may include substantially more pixels in each row than what is depicted in FIGS. 3-5. In addition, among other possibilities, the pixels may include vacuum-based photomultipliers, crystalline semiconductors (Cadmium Telluride and Cadmium Zinc Telluride CZT), and solid-state silicon sensors (avalanche diodes and silicon photomultipliers).

Figure 6A:
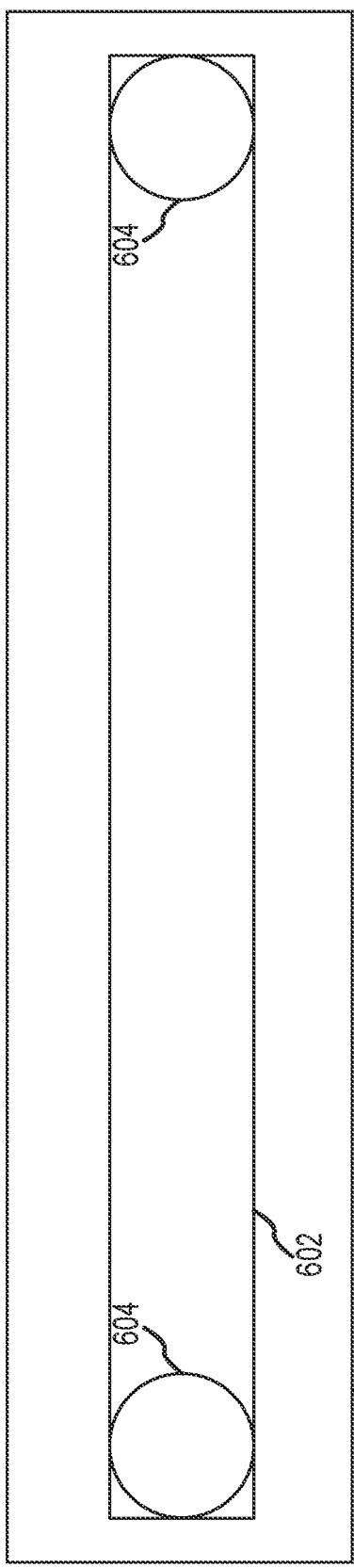
FIGS. 6A-B depict example slit apertures having photon absorbers.

FIG. 6A depicts an example housing 600, which includes a slit aperture 602 that includes photon absorbers 604. The slit aperture 602 may be placed at or near a photon source and in between the photon source and the detector. The photons generated from the photon source pass through the slit aperture 602 and form a fan beam that propagates toward the detector. By including photon absorbers 604, the intensity (i.e., the number of photons) of portions of the fan beam may be altered. For instance, in the example depicted in FIG. 6A, the photon absorbers 604 are located at the outer edges of the slit aperture 602. For instance, a first photon absorber 604 is positioned adjacent to a first outer edge of the slit aperture 602 and a second photon absorber 604 is positioned at a second outer edge of the slit aperture 602. By locating the photon absorbers 604 at the outer edges, the outer edges of the resultant fan beam have a lower intensity and thus a lower photon flux. As a result, pixels that are in the beam path of the lower intensity fan beam are less likely to be overwhelmed by the number of photons.

The photon absorber 604 may be made from a material based on the type or wavelength of the photons being emitted by the photon source. For instance, where the photons emitted are in the x-ray spectrum, the photon absorber 604 material may be a material that partially absorbs x-rays, such as tungsten. As an example, the photon absorber 604 may be a tungsten pin. The material and/or thickness of the photon absorber 604 may be configured to provide a desired intensity of photons that pass through the photon absorber 604. The width and location of the photon absorber alters the portion of the fan beam that has a reduced intensity.

In some examples, the photon absorbers 604 may be adjustable. For example, the location, width, and/or thickness of the photon absorber 604 may be adjustable. By altering the position of the photon absorbers 604, the portions of the fan beam that have a lower intensity may be altered. Thus, the intensity profile of the fan beam may be adjusted or altered based on the target or type of target that is being scanned. For instance, for targets that have certain portions that have minimal or no thickness, the photon absorbers 604 may be adjusted such that the portions of the fan beam that are on a minimally attenuated or unattenuated beam path have a lower intensity.

The adjustment of the photon absorbers may be accomplished manually or through automatic control from the radiographic scanning system. For instance, one or more of the photon absorbers 604 may be controlled through robotics, such as servomechanisms or other types of electromechanical positioning devices. A user interface may be displayed on a display of the radiographic scanning system that allows for positioning of the photon absorbers 604. The user interface may include inputs for directly positioning the photon absorbers 604 in the slit aperture 602. In other examples, the user interface may present inputs for selecting a type and/or size of target. Based on the type and/or size of target, the photon absorbers 604 may then be automatically moved or positioned based on pre-compiled positioning information for each type and/or size of target.

Figure 6B:
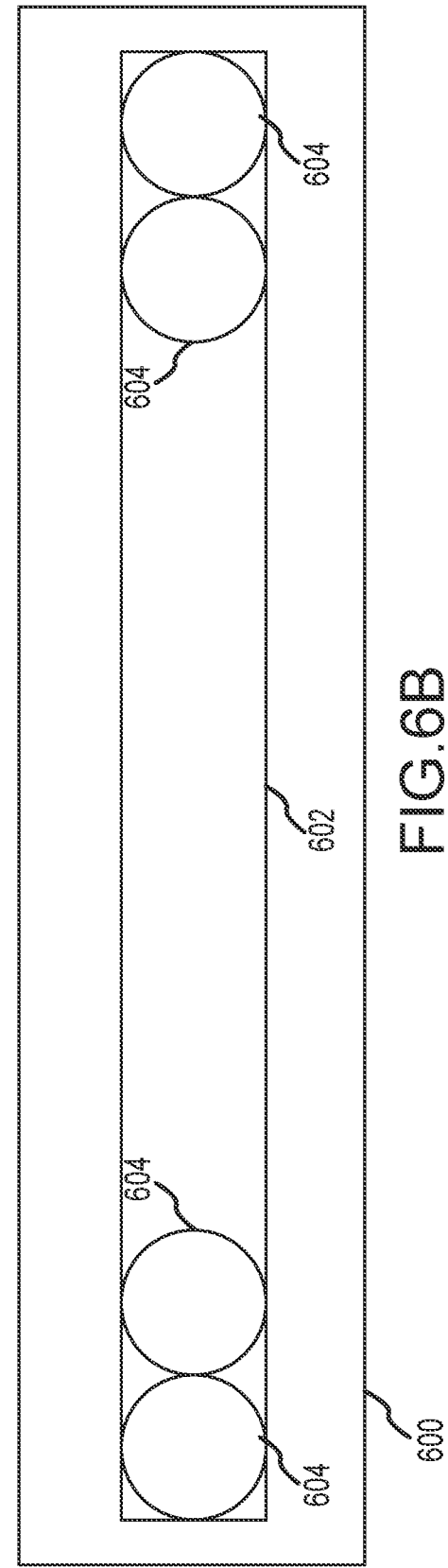

FIG. 6B depicts another example housing 600 that includes a slit aperture 602 having photon absorbers 604. FIG. 6B differs from FIG. 6A in that there are additional photon absorbers 604 depicted in FIG. 6B. In addition to being adjustable, the photon absorbers 604 may also be removable such that a greater or fewer number of photon absorbers 604 may be incorporated into the slit aperture 602. By incorporating additional photon absorbers 604, the intensity of additional portions of the fan beam may be reduced.

Different types of photon absorbers 604 may also be utilized. For instance, the slit aperture 602 may include thin photon absorbers 604 in positions where a higher intensity of photons is desired and include thick photon absorbers 604 in positions where a lower intensity of photons is desired.

Figure 7A:
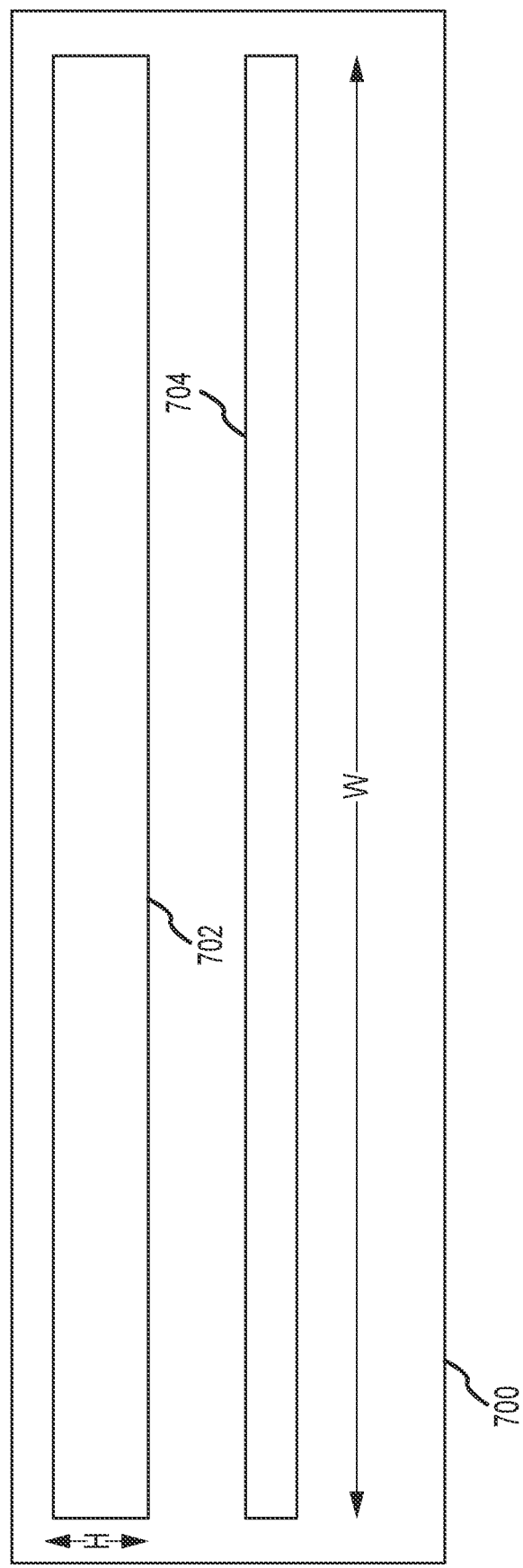

FIGS. 7A-C depict example slit aperture configurations. FIG. 7A depicts an example housing 700 having a first slit aperture 702 and a second slit aperture 704. The first slit aperture 702 is located above the second slit aperture 704, but in other examples, the configurations may be switched. The housing may be placed near the photon source and between the photon source and the detector such that a first fan beam of photons is formed by photons travelling through the first slit aperture 702 and a second fan beam of photons is formed by photons travelling through the second slit aperture 704. In the example depicted, the first slit aperture 702 and the second slit aperture 704 have the same width (W). Accordingly, the first fan beam produced from the first slit aperture 702 has the same width and angle as the second fan beam produced from the second slit aperture 704. The first slit aperture 702, however, has a different height (H) than the second slit aperture 704. Specifically, in the example depicted, the first slit aperture 702 has a greater height (H) than the second slit aperture 704. Accordingly, the flux of photons through the first slit aperture 702 is greater than the flux of photons through the second slit aperture 704.

The first slit aperture 702 may be aligned with a first row of pixels of a detector and the second slit aperture 704 may be aligned with a second row of pixels of the detector, such as the rows of the pixels depicted in FIG. 3 and described above. Accordingly, the first row of pixels receives the higher flux fan beam that passes through the first slit aperture 702. Similarly, the second row of pixels receives the lower flux fan beam that passes through the second slit aperture 704. Thus, the information generated about the target may be generated based on the photons that are counted by the first row of pixels and the photons counted by the second row of pixels. By utilizing a high-flux fan beam and a low-flux fan beam, the problems discussed above associated with too high of a flux or too low of a flux may be mitigated.

The pixels in the first and second rows of pixels may be uniform in shape and size. In other examples, the pixels in each row may have distributions and/or configurations discussed herein, such as the pixel configurations depicted in FIGS. 4A-B and 5 and described above.

FIG. 7B depicts another example housing 700 having a first slit aperture 702 and a second slit aperture 704. The first slit aperture 702 is located above the second slit aperture 704, but, in other examples, the configurations may be switched. The first slit aperture 702 has a width (W) that that is less than the width (W) of the second slit aperture 704.

The first slit aperture 702 may also have a height (H) that is greater than the height (H) of the second slit aperture 704. Due to the difference in height, the first slit aperture 702 allows for a greater flux of photons through the first slit aperture 702 and the second slit aperture 704 allows for a lesser flux of photons through the second slit aperture 704. Due to the differences in the width (W), the first fan beam from the first slit aperture 702 is narrower than the second fan beam from the second slit aperture 704.

The first slit aperture 702 may be aligned with a first row of pixels of a detector and the second slit aperture 704 may be aligned with a second row of pixels of the detector, as discussed above. The number of pixels in and/or the total width of the first row and the second row of pixels may be adjusted or configured based on the width of the first slit aperture 702 and the second slit aperture 704. For instance, the first row of pixels may have a smaller width than the second row of pixels because the first slit aperture 702 has a smaller width than the second slit aperture 704.

FIG. 7C depicts another example housing 700 having a first slit aperture 702, a second slit aperture 704, and a third slit aperture 706. The first slit aperture 702 has a first width and a first height. The second slit aperture 704 and the third slit aperture 706 have a second width and a second height. In the example depicted, the height of the first slit aperture 702 is greater than the height of the second slit aperture 704 and the third slit aperture 706. Accordingly, the flux of photons through the first slit aperture 702 is greater than the flux of photons through the second slit aperture 704 and the third slit aperture 706. The width of the first slit aperture 702, the second slit aperture 704, and the third slit aperture may be the same or different. The total width from the outer edge of the second slit aperture 704 to the outer edge of the third slit aperture 706 is greater than the width of the first slit aperture 702.

The first slit aperture 702 is positioned near or at the center of the housing 700. Thus, the high-flux fan beam of photons emanating from the first slit aperture 702 are directed towards the center of the target and the center of the detector. The second slit aperture 704 and the third slit aperture 706 are aligned with one another and located below the first slit aperture 702. The second slit aperture 704 and the third slit aperture 706 are offset or spaced apart from one another. Thus, the fan beams emanating from the second slit aperture 704 and the third slit aperture 706 are directed or centered on outer portions of the detector.

A first row of pixels of a detector may be aligned with the first slit aperture 702. A second row of pixels may be aligned with the second slit aperture 704 and the third slit aperture 706. The number of pixels in, and/or the total width of, the first row and the second row of pixels may be adjusted or configured based on the position and width of the first slit aperture 702 and/or the positions and widths of the second slit aperture 704 and the third slit aperture 706. For instance, the second row of pixels may include a gap near the middle of the row of pixels that corresponds to the gap between the second slit aperture 704 and the third slit aperture 706. In addition, the total width of the second row of pixels may be greater than the total width of pixels in the first row.

FIG. 8 depicts an example method 800 for radiographic scanning of a target. The operations of method 800 may be performed by the systems and/or components of systems discussed herein. For instance, memory of the system may store instructions for performing the operations of method 800. One or more processors of the system may execute those instructions to cause the system to perform the operations.

At operation 802, a first photon beam is emitted from a photon source. The first photon beam may be an x-ray beam, gamma-ray beam, or other beam of photons suitable to pass through the target at least partially. The first photon beam may be a fan beam, and the fan beam may be formed through the use of one or more slit apertures. The photon beam is emitted at a first intensity. The first intensity of the first photon beam may be described in terms of the average number of photons emitted in the first photon beam. The intensity of the first photon beam may be measured as its average flux (i.e., number of photons per second per unit area). The photons in the first energy beam may also have an average energy or an average energy spectrum.

The first photon beam may also pass through a filter that results in filtered photons including high-energy photons and low-energy photons. For instance, where the photons are x-ray photons, the photon beam may be passed through a k-edge samarium filter that results in removal of mid-energy photons at or slightly above the k-edge, and high-energy and low-energy photons passing through the filter. As an example, the filter may allow photons in two energy spectrums to pass through the filter, but the remainder of the photons are blocked. In examples where the photons are x-ray photons, the photons having an energy greater than at least the k-edge may be classified as high-energy photons and the photons having an energy less than the k-edge may be classified as low-energy photons.

When the photon source emits the first photon beam, the photon source is in a first position relative to the target. In an example of stand-up radiographic scanning system, the first position may be at the head of the human target.

At operation 804, a second photon beam is emitted from the photon source. The energy spectrum of the second beam is substantially the same as the first photon beam, and the second photon beam is of the same type as the first photon beam (e.g., x-ray beam, gamma-ray beam, etc.). For example, the average energy of the photons emitted in the second photon beam is substantially the same as the average energy of the photons emitted in the first photon beam. The second photon beam may also be passed through a filter that results in filtered photons including high-energy photons and low-energy photons.

The second photon beam, however, is emitted at a second intensity that is different from the first intensity of the first photon beam. For instance, the second photon beam includes a greater or fewer number of photons. In other words, the second photon beam has a larger or smaller flux rate than the first photon beam. Thus, if the flux rate is too high or too low in the first photon beam for some pixels of the detector, the flux rate of the second photon beam is different and thus allows for a higher likelihood that the flux rate of either the first photon beam or the second photon beam is suitable for substantially all pixels in the detector. Changing the intensity of the photon beam may be accomplished by changing the current through the photon source (otherwise referred to as the tube current). For example, for an x-ray tube, increasing the tube current causes an increase in intensity and more photons are emitted. Conversely, decreasing the tube current causes a decrease in intensity of the emitted photon beam. Of note, increasing the voltage across the tube also increases the intensity of the photon beam, but an increase in voltage also causes an increase in the energy spectrum of the emitted photons. Accordingly, modifying the current rather than the voltage causes an increase in the intensity of the photon beam while retaining substantially the same energy spectrum of the emitted photons.

The second photon beam is emitted while the photon source is in substantially the same position that the photon source was in when the first photon beam was emitted. In some examples, the photon source may remain stationary while emitting the first photon beam and the second photon beam. In other examples, the photon source may be continuously moving, and the second photon beam may be emitted almost immediately after the first photon beam. Thus, in such an example, the first photon beam and second photon beam are not emitted at the exact same location, but the two beams are emitted at substantially the same location. As used herein, substantially the same location may mean within 3 mm of one another or within an average pixel height.

The first photon beam and the second photon beam may also be emitted in separate scans or sweeps. For example, the photon source may move from the top to the bottom of the target (e.g., head to toe of a human target) while emitting photon beams along the way. The photon source may then move from bottom to top of the target or again from the top to the bottom of the target. The first photon beam may be emitted during the first sweep or scan and the second photon beam may be emitted during the second sweep or scan.

At operation 806, the emitted first photon beam and the emitted second photon beam are detected by a photon counting detector. The photon counting detector detects the first photon beam and the second photon beam by counting the number of photons that reach each of the pixels of the detector. The detector may also categorize or bin the counted number of photons based on the energy of each of the counted photons. For example, if a detected photon has an energy higher than the k-edge, the photon may be categorized as high-energy and/or counted in the high-energy bin. In contrast, a detected photon has an energy lower than the k-edge, the photon may be categorized as low-energy and/or counted in the low-energy bin. The photons may be counted as they reach the pixels. Accordingly, the photons of the first photon beam are detected/counted prior to detecting/counting the photons of the second photon beam.

At operation 808, a third photon beam is emitted from the photon source. The third photon beam is emitted at a second location relative to the target that is a different location from where the first photon beam and second photon beam were emitted. In an example of stand-up radiographic scanning system, the second position may be at the torso of the human target. Accordingly, the system moves the photon source from the first position to the second position between emitting the second photon beam and the third photon beam. The photon source may be continuously moving through the second location when then third photon beam is emitted, or the photon source may stop at the second location to emit the third photon beam. The third photon beam may also be emitted during a first scan or sweep of the target.

The third photon beam has substantially the same intensity and energy spectrum as the first photon beam. For instance, the third photon beam has substantially the same flux as the first photon beam. The photons in the third photon beam also have substantially the same energy spectrum as the photons in the first photon beam.

At operation 810, a fourth photon beam is emitted from the photon source. The fourth photon beam is emitted at substantially the same position as the third photon beam. For instance, the fourth photon beam may be emitted while the photon source is stopped, or in other examples, while the photon source is moving. The fourth photon beam may also be emitted in a second sweep or scan of the target. The fourth photon beam has substantially the same intensity and energy spectrum as the second photon beam. Accordingly, the intensity of the third photon beam is different from the intensity of the fourth photon beam. Thus, at the second position relative to the target, two photon beams of different intensities (e.g., different fluxes) are emitted from the photon source.

At operation 812, the third photon beam and the fourth photon beam are detected by the photon counting detector. The photon counting detector detects the third photon beam and the fourth photon beam by counting the number of photons that reach each of the pixels of the detector. The detector may also categorize or bin the counted number of photons based on the energy of each of the counted photons. For example, if a detected photon has an energy higher than the k-edge, the photon may be categorized as high-energy and/or counted in the high-energy bin. In contrast, a detected photon has an energy lower than the k-edge, the photon may be categorized as low-energy and/or counted in the low-energy bin. The photons may be counted as they reach the pixels. Accordingly, the photons of the third photon beam are detected/counted prior to detecting/counting the photons of the fourth photon beam.

At operation 814, information about the target is generated based on the detected photon beams. For example, based on the photon counts, and in some examples the respective energy levels of the counted photons, information about the target may be generated. For human targets, the information generated about the target may be body composition data, such as the body composition data discussed in the '636 Publication.

In some examples, the number of photon beams emitted is greater than four. For instance, photon beams may be generated at many positions along the target to help accurately capture data for the entire target. Additional photon beams may also be generated at each position that have different energy spectrums. For instance, in examples where a samarium or similar filter is not used, photon beams with high energy may be emitted followed by photon beams having low energy (or vice versa). In such examples, at each position, two high-energy photon beams with different intensities may be emitted along with two low-energy photon beams with different intensities. The photon beams may be emitted sequentially while the photon source is stopped or while the photon source is moving. The photon beams may also be emitted during different sweeps or scans of the target.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for performing radiographic scanning, the system comprising:
    a photon source configured to emit photons;
    a photon counting detector for detecting photons emitted from the photon source after passing through a target, the photon counting detector comprising first pixels having a first size and second pixels having a second size, wherein the first size is greater than the second size;
    a first slit aperture positioned between the photon source and the photon counting detector, the first slit aperture having a first slit height; and
    a second slit aperture positioned between the photon source and the photon counting detector, the second slit aperture having a second slit height, wherein the second slit height is less than the first slit height.

2. The system of claim 1, wherein the first pixels are arranged in a first row of the photon counting detector and the second pixels are arranged in a second row of pixels.

3. The system of claim 2, wherein the first row and the second row are separated by a gap.

4. The system of claim 1, wherein the first pixels are arranged in an alternating pattern with the second pixels.

5. The system of claim 1, wherein a pixel density of the first pixels is greater in a central third of the photon counting detector than an outer third of the photon counting detector.

6. The system of claim 1, further comprising:
    a photon absorber positioned adjacent an outer portion of at least one of the first slit aperture and the second slit aperture to absorb a portion of the photons emitted from the photon source.

7. The system of claim 6, wherein the photon absorber is adjustable to increase or decrease an amount of the at least one of the first slit aperture and the second slit aperture that is covered by the photon absorber.

8. The system of claim 6, wherein the photon source is an x-ray tube and the photon absorber includes at least one tungsten pin.

9. The system of claim 1, wherein the first pixels are aligned with the first slit aperture and the second pixels are aligned with the second slit aperture.

10. The system of claim 1, wherein the photon source is mounted to a source assembly configured to move along a longitudinal axis of the target, and wherein the photon counting detector is mounted to a detector assembly configured to move along the longitudinal axis of the target.

11. The system of claim 10, wherein the source assembly and the detector assembly are physically connected via an arm.

12. The system of claim 10, wherein the longitudinal axis is in a vertical direction.

13. The system of claim 1, wherein a ratio between the first size of the first pixels and the second size of the second pixels is between 1.5 and 3.

14. The system of claim 1, wherein the first slit aperture has a first slit width and the second slit aperture has a second slit width, the first slit width different than the second slit width.

15. The system of claim 1, wherein the second slit aperture comprises at least two discrete apertures.

16. A system for performing radiographic scanning, the system comprising:
    a photon source configured to emit photons;
    a photon counting detector for detecting photons emitted from the photon source after passing through a target, the photon counting detector comprising first pixels having a first size and second pixels having a second size, wherein the first size is greater than the second size;
    a slit aperture positioned between the photon source and the photon counting detector; and
    a photon absorber positioned adjacent an outer portion of the slit aperture to absorb a portion of the photons emitted from the photon source, wherein the photon source is an x-ray tube and the photon absorber includes at least one tungsten pin.

17. The system of claim 16, wherein the photon absorber is adjustable to increase or decrease an amount of the slit aperture that is covered by the photon absorber.

18. A system for performing radiographic scanning, the system comprising:
    a photon source configured to emit photons; and
    a photon counting detector for detecting photons emitted from the photon source after passing through a target, the photon counting detector comprising first pixels having a first size and second pixels having a second size, wherein the first size is greater than the second size,
    wherein the photon source is mounted to a source assembly configured to move along a longitudinal axis of the target, and wherein the photon counting detector is mounted to a detector assembly configured to move along the longitudinal axis of the target.

19. The system of claim 18, wherein the first pixels are arranged in a first row of the photon counting detector and the second pixels are arranged in a second row of pixels.

* * * * *